W. M. MAY.
CAR FENDER.
APPLICATION FILED MAY 5, 1911.
1,025,533.
Patented May 7, 1912.
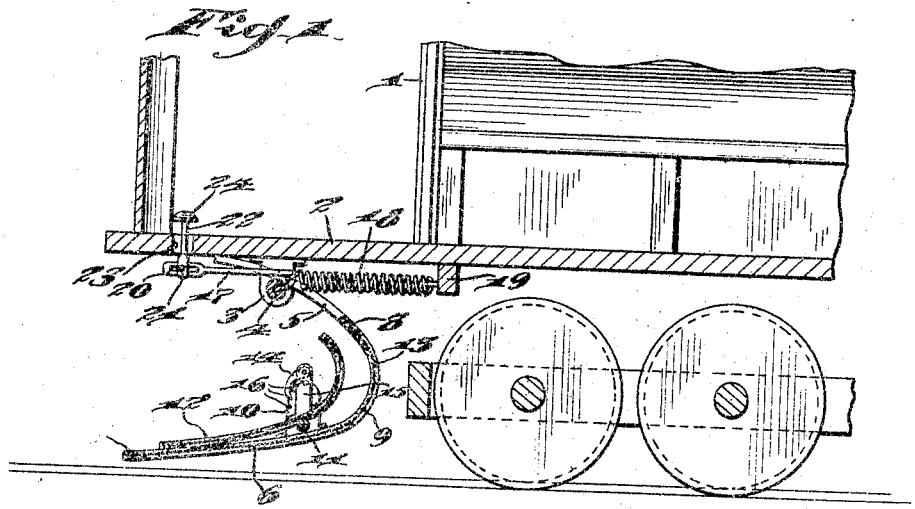
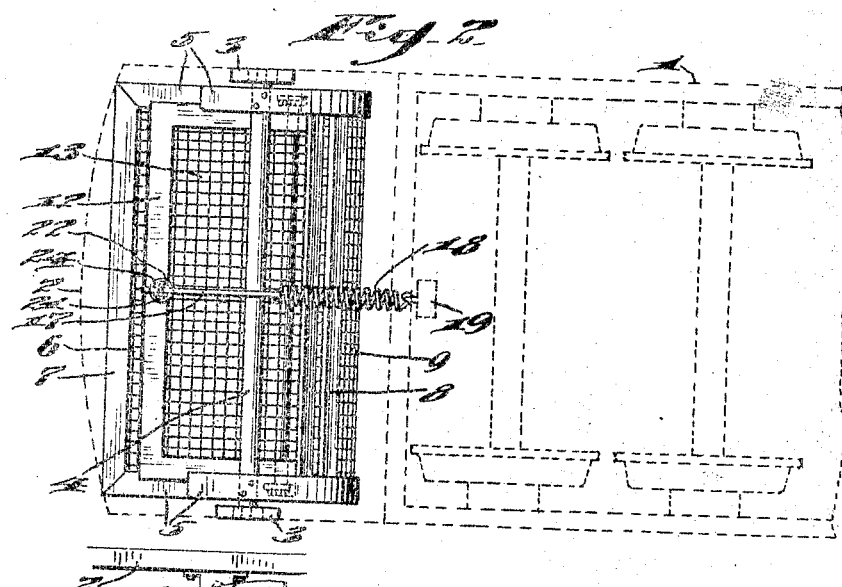
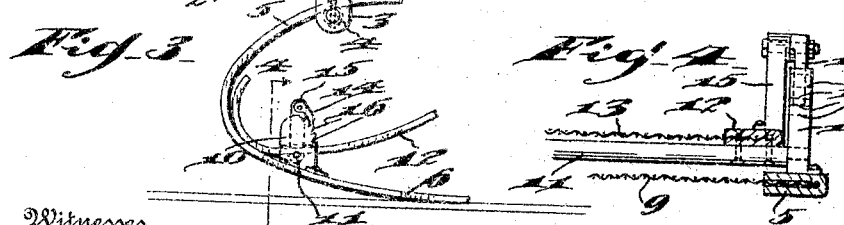
Witnesses
Inventor
William M. May,
By Joshua R. H. Potts,
Attorney

UNITED STATES PATENT OFFICE.

WILLIAM M. MAY, OF PHILADELPHIA, PENNSYLVANIA, ASSIGNOR OF ONE-HALF TO SAMUEL F. SHANNON, OF PHILADELPHIA, PENNSYLVANIA.

CAR-FENDER.

1,025,533.

Specification of Letters Patent. Patented May 7, 1912.

Application filed May 5, 1911. Serial No. 625,314.

*To all whom it may concern:*

Be it known that I, WILLIAM M. MAY, a citizen of the United States, residing at Philadelphia, in the county of Philadelphia and State of Pennsylvania, have invented certain new and useful Improvements in Car-Fenders, of which the following is a specification.

My invention relates to improvements in car-fenders, and more particularly to a car fender which is normally supported above the track, but which may be dropped down onto the track, so as to effectually pick up a person or object on the track.

A further object is to provide on a scoop car fender, a second fender which swings or pivots when the person or object rolls onto the fender, and is held in a position to prevent any possibility of the person or object rolling off the fender.

With these and other objects in view, the invention consists in certain novel features of construction and combinations and arrangements of parts, as will be more fully hereinafter described and pointed out in the claims.

In the accompanying drawings: Figure 1, is a view in longitudinal section illustrating my improved fender attached to a street car and in its normal set position. Fig. 2, is a top plan view of Fig. 1 showing the car in dotted lines. Fig. 3, is a fragmentary view in side elevation showing the fender in tripped and dropped position, and Fig. 4, is a fragmentary view in section of one end of the fender on an enlarged scale on the line 4—4 of Fig. 3.

1, represents the car having the ordinary platform 2, below which my improved fender is mounted, as will now be described.

3, 3, are brackets which are secured to the bottom of platform 2, and provide a rotary mounting for a transverse shaft 4. On this shaft 4, parallel curved bars 5 are secured. These bars 5 project forwardly beyond the shaft 4, and normally bear against the bottom of the platform 2 to limit the upward movement of the free end of the main fender 6. The bars 5 above referred to are curved as shown, and constitute the side bars of the main fender 6, and these bars 5 at their forward ends are connected by a transverse bar 7, and at a point adjacent the shaft 4, with a transverse bar 8. The bars 5, 7, and 8, are each preferably composed of heavy metal, the several bars being bent upon themselves and confining the edges of a metal screen 9 of heavy wire mesh, the edges being secured and confined in the bars in any approved manner.

On the side bars of main fender 6, upwardly projecting brackets 10 are secured, and afford a rotary mounting for a transverse shaft 11. One side of this shaft 11 is made flat to receive what I term a holding fender 12. This holding fender 12 comprises side and end bars of bent metal, confining a metal screen 13 of heavy wire mesh, and this fender is bent so that it curves sharply at its inner end, and more gradually throughout its outer end, as seen most clearly in Figs. 1, and 3. This holding fender 12 is normally positioned as shown in Fig. 1, with its forward end resting on the main fender 6, and is adapted when the main fender 6 is dropped to receive a person or object which is picked up by the main fender 6. After said person or object passes shaft 11, or over-balances this holding fender 12 at its inner end, this holding fender will tilt to the position shown in Fig. 3, and will be held in this tilted position by means of a pivoted pawl 14. The pawl 14 is pivoted to an upright arm 15 on the fender 12, and engages a series of ratchet teeth 16 on one of the brackets 10.

To the shaft 4, a forwardly projecting rod 17 is secured, and is preferably bent at its point of engagement with shaft 4, for the rod attachment of one end of a coiled spring 18, said coiled spring projecting rearwardly and being connected at its rear end to a block 19 on the bottom of the car 1. The forward end of the rod 17 is provided with a longitudinal slot 20 to receive a pin 21, pivotally connecting a foot plunger 22 with said rod. This foot plunger 22 moves through an opening 23 in the platform 2, and is provided at its upper end with a head 24, upon which the motorman may place his foot.

The operation is as follows: Normally the parts are in the position shown in Fig. 1 with the forward end of the main fender 6 elevated slightly above the track. When the motorman sees a person or object on the track, and he cannot stop his car, he depresses the plunger 22, which, through the medium of the rod 17, causes the shaft 4 to turn, and as the bars 5 are secured to this shaft, the forward end of the fender 6 is forced downwardly into close contact with the track. When in this position the main fender 6 constitutes a scoop to pick up the person or object, and said person or object will roll onto the holding fender 12. The movement of the car will cause the person or object to roll back on the holding fender 12 far enough to over-balance said holding fender, and cause the shaft 11 to turn, tilting the holding fender to the position shown in Fig. 3 when it constitutes, in effect, a cradle, into which the person or object is held by reason of the pawl 14, and ratchet teeth 16, so as to prevent any possibility of the person or object rolling off of the fender. When the pressure on the plunger 22 is released, and there is no weight on the fenders, the spring 18 will return the main fender 6 to normal position, but it is necessary to manually lift the pawl 14 to permit the holding fender 12 to assume its normal position.

Various slight changes might be made in the general form and arrangement of the parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a car fender, the combination with a car and a platform thereon, of brackets depending from the bottom of the platform, a shaft having rotary mounting in the platform, a scoop fender, side bars on said scoop fender secured between their ends to said shaft, and at one end bearing against the bottom of said platform whereby the upward movement of the free end of the fender is limited, a spring normally holding said fender in elevated position, and means for lowering said fender, substantially as described.

2. In a car fender, the combination with a car and a platform thereon, of brackets depending from the bottom of the platform, a shaft having rotary mounting in the platform, a scoop fender, side bars on said scoop fender secured between their ends to said shaft, and at one end bearing against the bottom of said platform whereby the upward movement of the free end of the fender is limited, a forwardly projecting bent rod secured to said shaft, a plunger projecting through the platform and engaging said rod, and adapted to turn said shaft when the plunger is depressed, and a rearwardly projecting spring connected at its forward end to said rod, and at its rear end to said car, substantially as described.

3. In a car fender, the combination with a car platform, a scoop fender pivotally supported below said platform, means for holding the scoop fender normally elevated, and means for depressing the scoop fender, of a holding fender pivotally supported between its ends on the main fender, and means for locking said holding fender in its tilted or operative position, substantially as described.

4. In a car fender, the combination with a car platform, a scoop fender pivotally supported below said platform, means for holding the scoop fender normally elevated, and means for depressing the scoop fender, of a holding fender pivotally supported between its ends on the main fender, a ratchet rack on said scoop fender, and a pivoted pawl on said holding fender engaging the ratchet rack and constructed to secure the holding fender in its tilted or operative position, substantially as described.

5. The combination with a main scoop fender, upwardly projecting brackets secured on said fender, a shaft supported in said brackets, a holding fender secured on said shaft and when tilted by the movement of a person or object thereon constituting a cradle for the support of said person or object, and means for locking said holding fender in its tilted position, substantially as described.

6. The combination with a main scoop fender, upwardly projecting brackets secured on said fender, a shaft supported in said brackets, a holding fender secured on said shaft and when tilted by the movement of a person or object thereon constituting a cradle for the support of said person or object, one of said brackets having a ratchet rack thereon, an upwardly projecting arm on said holding fender, and a pivoted pawl on said arm engaging said ratchet rack, substantially as described.

In testimony whereof I have signed my name to this specification in the presence of two subscribing witnesses.

WILLIAM M. MAY.

Witnesses:
  SAMUEL F. SHANNON,
  CHARLES E. POTTS.